US009631710B1

(12) United States Patent
Slinger et al.

(10) Patent No.: US 9,631,710 B1
(45) Date of Patent: Apr. 25, 2017

(54) MULTIPLE PURPOSE TOOL ASSEMBLY

(71) Applicants: Gary A. Slinger, Canadensis, PA (US); Andrea Slinger, Canadensis, PA (US)

(72) Inventors: Gary A. Slinger, Canadensis, PA (US); Andrea Slinger, Canadensis, PA (US)

( * ) Notice: Subject to any disclaimer, the term of this patent is extended or adjusted under 35 U.S.C. 154(b) by 767 days.

(21) Appl. No.: 14/080,041

(22) Filed: Nov. 14, 2013

(51) Int. Cl.
*B23P 9/02* (2006.01)
*F16H 19/08* (2006.01)

(52) U.S. Cl.
CPC ................... *F16H 19/08* (2013.01)

(58) Field of Classification Search
CPC ......... B23P 19/04; B23P 19/061; B23P 19/10; B25B 1/18; B25B 9/04
See application file for complete search history.

(56) References Cited

U.S. PATENT DOCUMENTS

| 4,476,616 A * | 10/1984 | Jensen ................... B25B 27/146 24/27 |
| 4,779,335 A | 10/1988 | Schwartzman et al. |
| 4,914,941 A | 4/1990 | Ijiri et al. |
| 5,495,742 A * | 3/1996 | Dorsett ................. B21D 39/021 100/271 |
| 5,711,183 A * | 1/1998 | Mattsson ............. B21D 39/021 100/282 |
| 6,138,346 A | 10/2000 | Shutts et al. |
| 6,196,045 B1 | 3/2001 | Thomas et al. |
| 6,415,487 B1 * | 7/2002 | Leimer ................... B25B 27/10 29/213.1 |
| 6,662,620 B1 | 12/2003 | Baron et al. |
| D614,472 S | 4/2010 | Meyers et al. |
| 8,141,459 B2 * | 3/2012 | Myburgh ................ B25B 21/00 81/57 |

* cited by examiner

Primary Examiner — Lee D Wilson

(57) ABSTRACT

A multiple purpose tool assembly for performing various manipulations of a pipe includes a tubular housing that may be gripped by a user. The tubular housing is selectively positionable proximate a pipe. A motor is operationally coupled to the tubular housing. A worm gear is operationally coupled to the motor so the motor selectively rotates the worm gear. An actuator is operationally coupled to the tubular housing. The actuator is operationally coupled to the motor so the actuator selectively actuates the motor. A head is removably coupled to the tubular housing. The head is operationally coupled to the worm gear so the head is selectively actuated. The head selectively engages the pipe so the head may selectively manipulate the pipe.

17 Claims, 6 Drawing Sheets

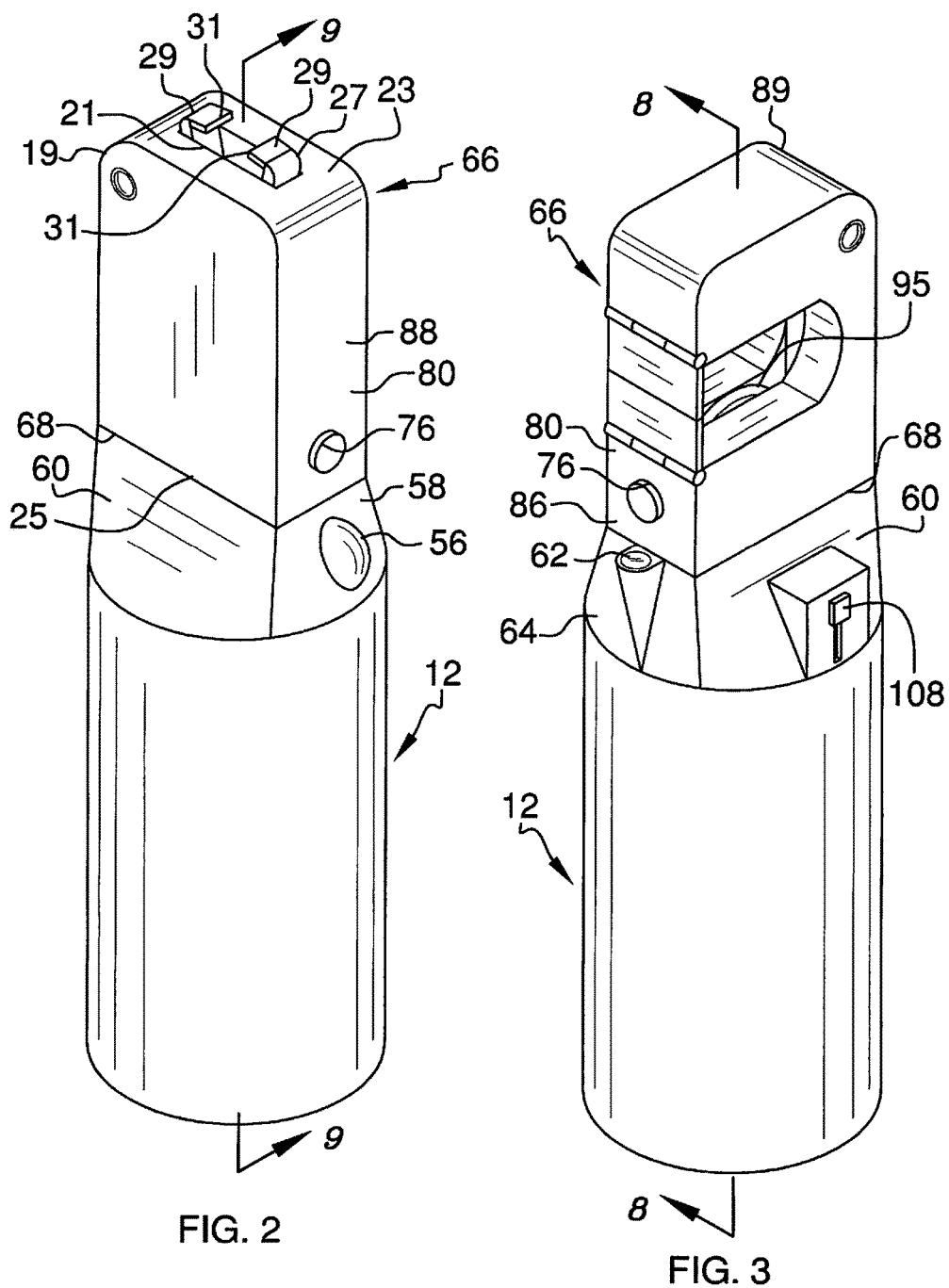

MULTIPLE PURPOSE TOOL ASSEMBLY

BACKGROUND OF THE DISCLOSURE

Field of the Disclosure

The disclosure relates to multiple purpose tool devices and more particularly pertains to a new multiple purpose tool device for performing various manipulations of a pipe.

SUMMARY OF THE DISCLOSURE

An embodiment of the disclosure meets the needs presented above by generally comprising a tubular housing that may be gripped by a user. The tubular housing is selectively positionable proximate a pipe. A motor is operationally coupled to the tubular housing. A worm gear is operationally coupled to the motor so the motor selectively rotates the worm gear. An actuator is operationally coupled to the tubular housing. The actuator is operationally coupled to the motor so the actuator selectively actuates the motor. A head is removably coupled to the tubular housing. The head is operationally coupled to the worm gear so the head is selectively actuated. The head selectively engages the pipe so the head may selectively manipulate the pipe.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 2 is a right side perspective view of an embodiment of the disclosure.

FIG. 3 is a left side perspective view of an embodiment of the disclosure.

DESCRIPTION OF THE PREFERRED EMBODIMENT

Figure 1:
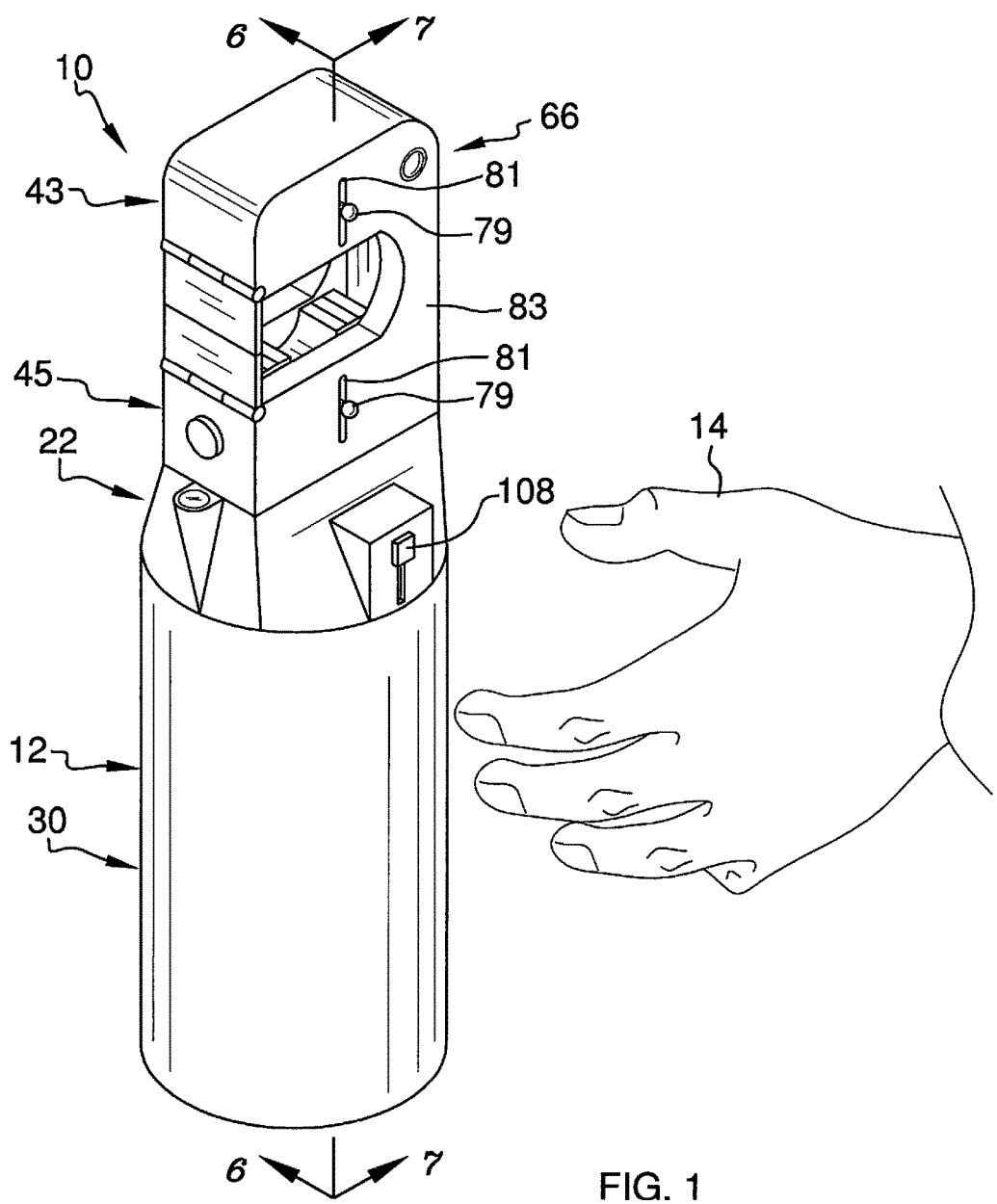
FIG. 1 is a perspective view of a multiple purpose tool assembly according to an embodiment of the disclosure.
Figure 4:
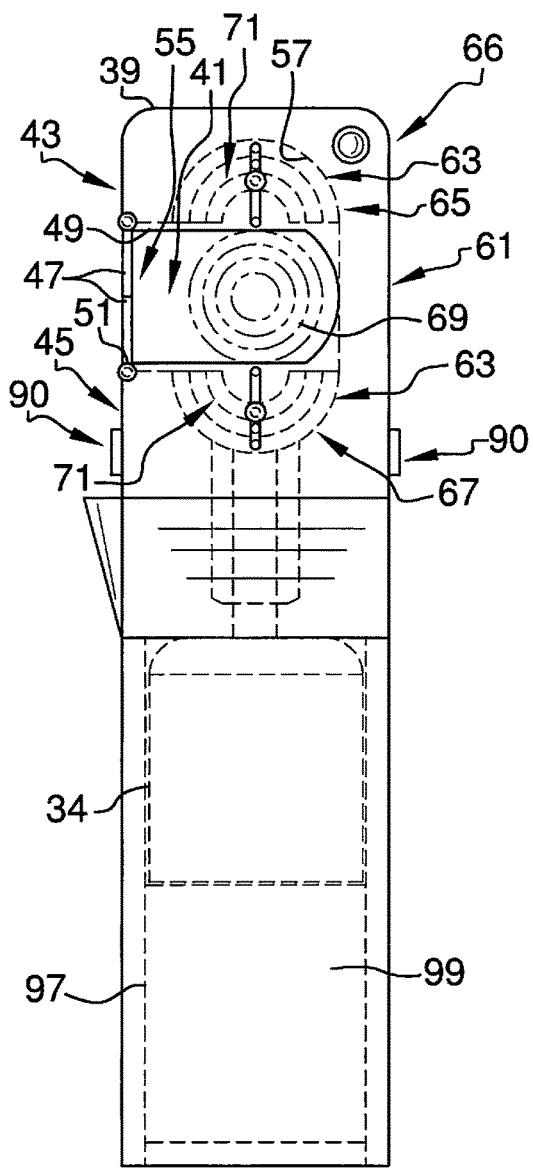
FIG. 4 is a left side view of an embodiment of the disclosure.
Figure 5:
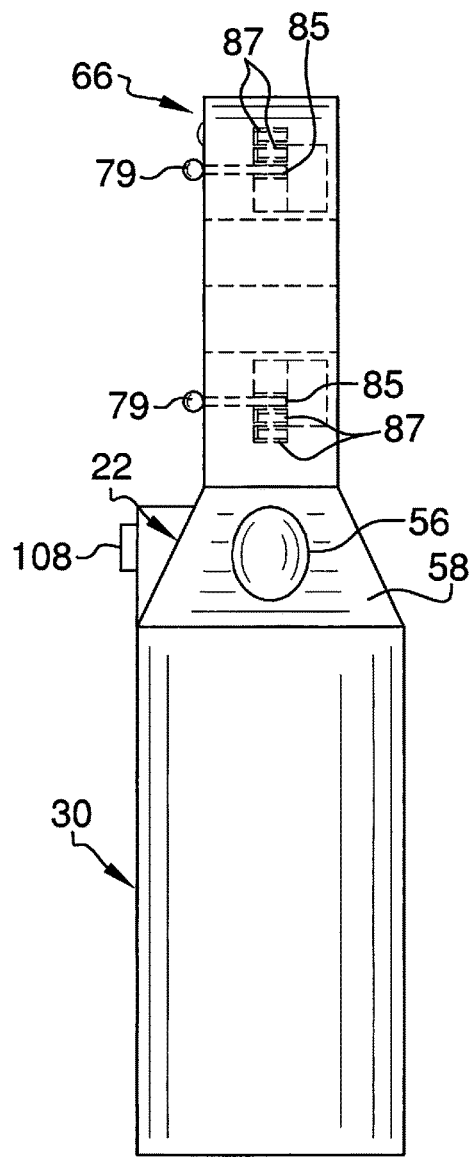
FIG. 5 is a front view of an embodiment of the disclosure.
Figure 6:
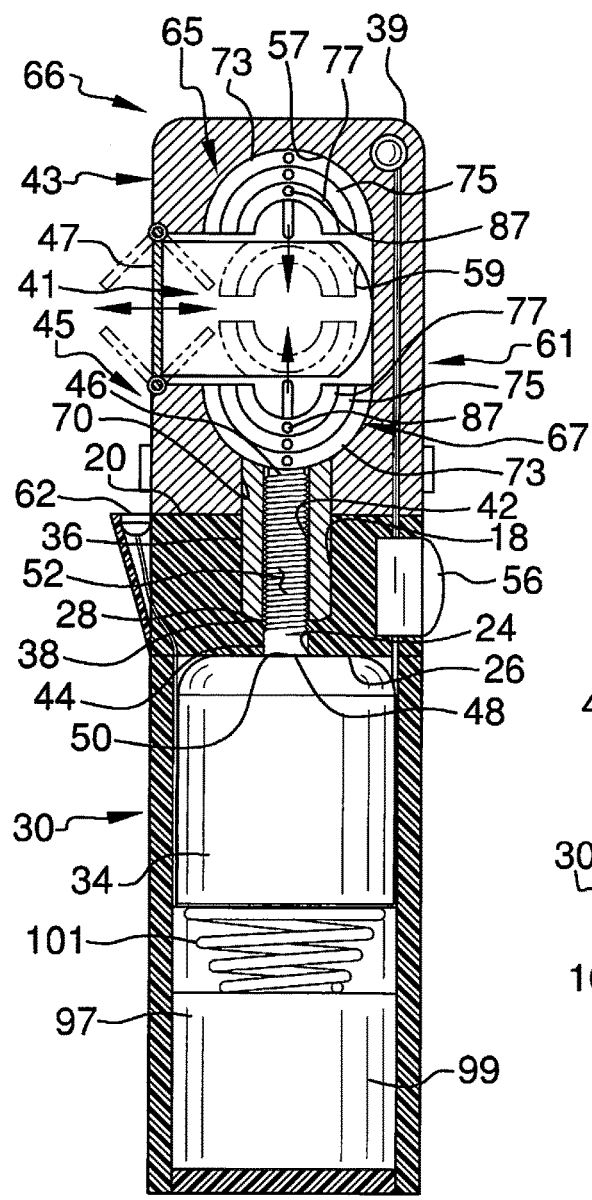
FIG. 6 is a cross sectional view taken along line 6-6 of FIG. 1 of an embodiment of the disclosure.
Figure 7:
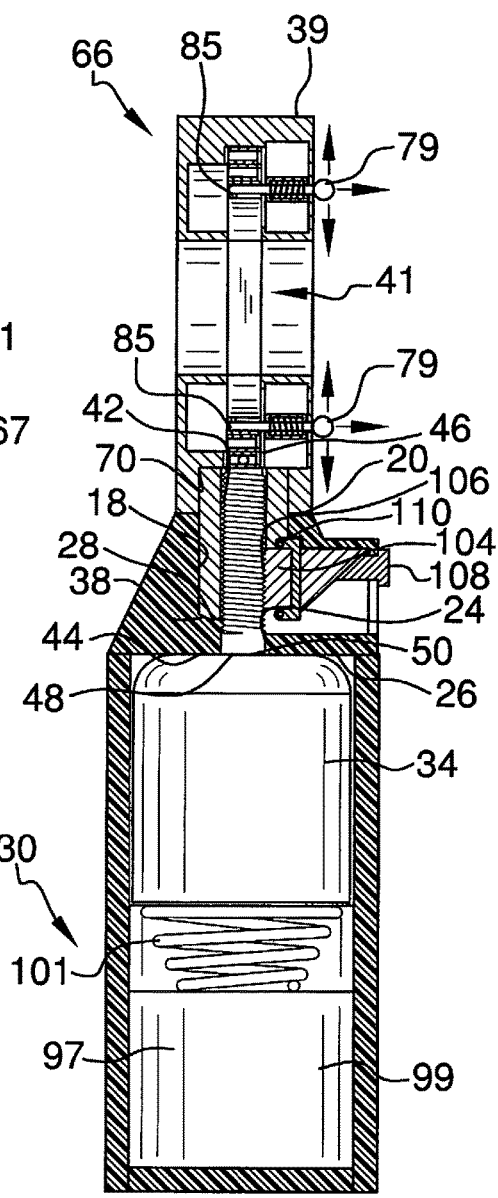
FIG. 7 is a cross sectional view taken along line 7-7 of FIG. 1 of an embodiment of the disclosure.
Figure 8:
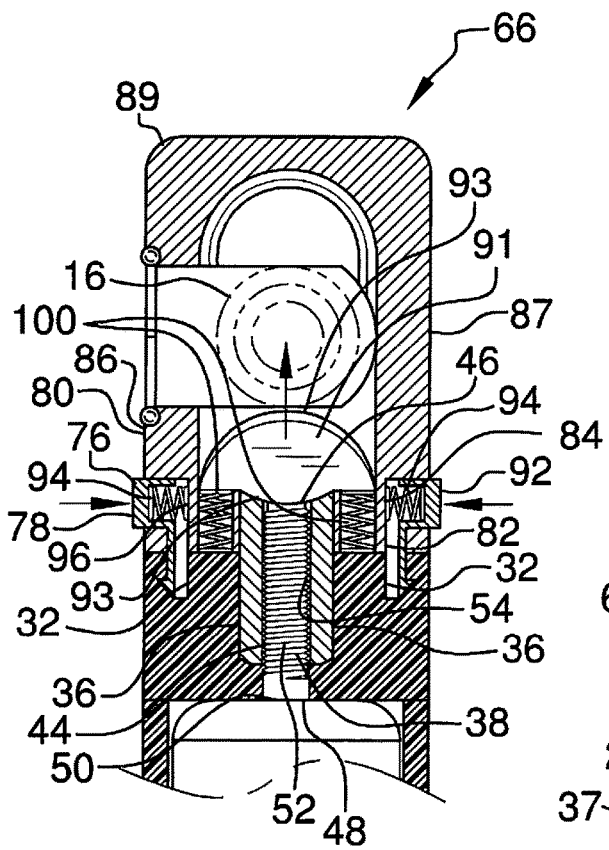
FIG. 8 is a cross sectional view taken along line 8-8 of FIG. 4 of an embodiment of the disclosure.
Figure 9:
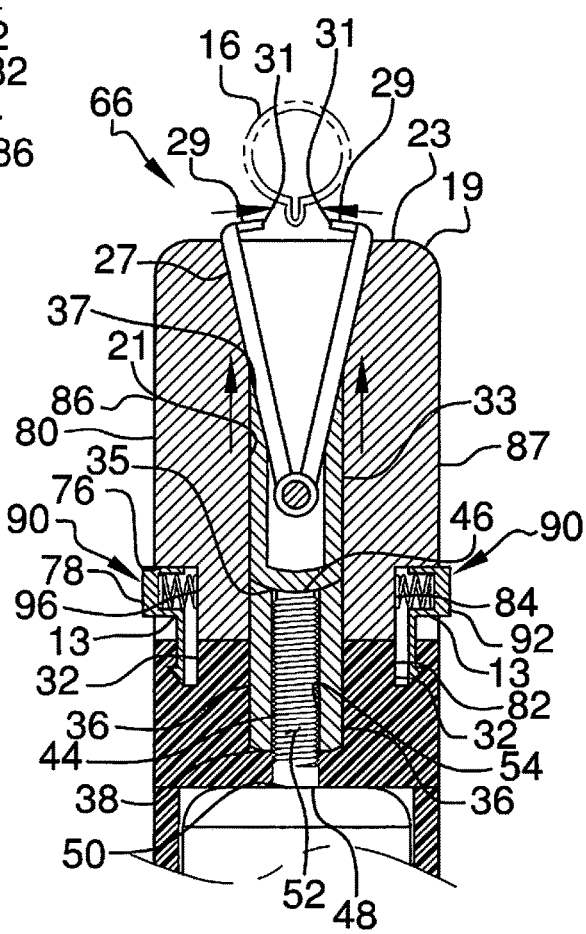
FIG. 9 is a cross sectional view taken along line 9-9 of FIG. 2 of an embodiment of the disclosure.
Figure 10:
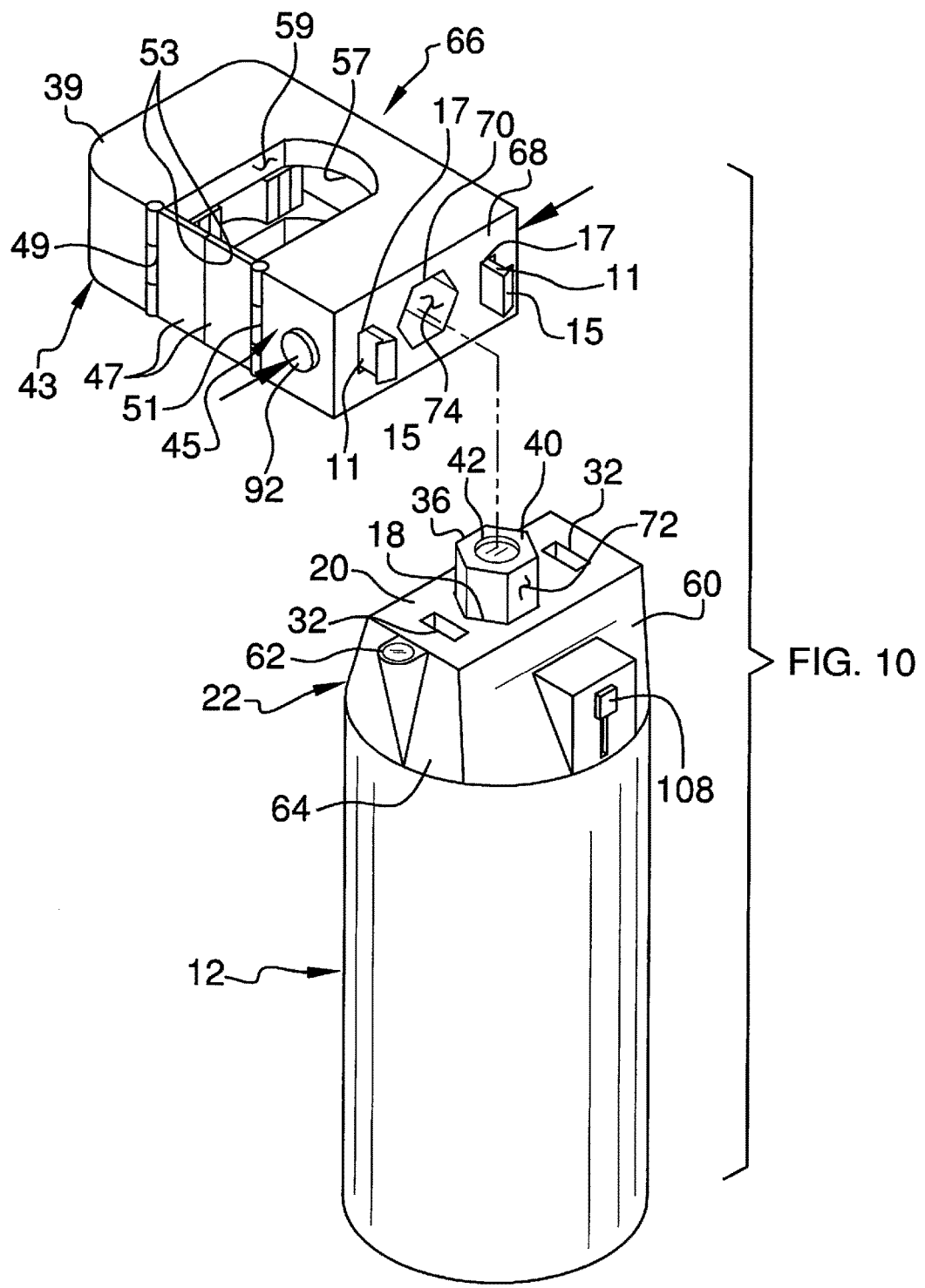
FIG. 10 is a exploded top view of an embodiment of the disclosure.

With reference now to the drawings, and in particular to FIGS. 1 through 10 thereof, a new multiple purpose tool device embodying the principles and concepts of an embodiment of the disclosure and generally designated by the reference numeral 10 will be described.

As best illustrated in FIGS. 1 through 10, the multiple purpose tool assembly 10 generally comprises a tubular housing 12 that may be gripped by a user 14 so the tubular housing 12 is selectively positionable proximate a pipe 16. The tubular housing 12 may have a length between 10 cm and 15 cm and a diameter between 5 cm and 8 cm. Additionally, the pipe 16 may be PEX plumbing pipe of any conventional design.

A hexagonal worm gear well 18 extends downwardly into a top side 20 of a trapezoidal top portion 22 of the tubular housing 12. The trapezoidal top portion 22 of the tubular housing 12 may have a length between 2 cm and 3 cm. A worm gear aperture 24 extends through a bottom side 26 of the trapezoidal top portion 22 of the tubular housing 12 and a bottom wall 28 of the hexagonal worm gear well 18. Moreover, the hexagonal worm gear well 18 is in fluid communication with an interior of a bottom portion 30 of the tubular housing 12. The bottom portion 30 of the tubular housing 12 may have a length between 10 cm and 15 cm. Lastly, a pair of tab wells 32 extends downwardly into the top side 20 of the trapezoidal top portion 22 of the tubular housing 12. Each of the pair of tab wells 32 is positioned on opposite sides of the hexagonal worm gear well 18.

A motor 34 is coupled to the tubular housing 12. The motor 34 is positioned within the interior of the bottom portion 30 of the tubular housing 12 proximate the worm gear aperture 24. The motor 34 may be a DC electrical motor of any conventional design. A worm gear retainer 36 having a hexagonal outer shape is positioned within the hexagonal worm gear well 18. Continuing, a bottom end 38 of the hexagonal worm gear retainer 36 abuts the bottom wall 28 of the hexagonal worm gear well 18. A top end 40 of the hexagonal worm gear retainer 36 extends upwardly from the top side 20 of the trapezoidal top portion 22 of the tubular housing 12. Finally, the hexagonal worm gear retainer 36 may have a length between 1.5 cm and 2.5 cm.

A rotation aperture 42 extends through the bottom end 38 and the top end 40 of the hexagonal worm gear retainer 36 so the rotation aperture 42 is aligned with the worm gear aperture 24. A worm gear 44 is provided. The worm gear 44 is elongated along a longitudinal axis extending through a bottom end 46 and a top end 48 of the worm gear 44. Moreover, the bottom end 46 of the worm gear 44 is rotationally coupled to a top end 50 of the motor 34. The worm gear 44 extends upwardly through the worm gear aperture 24 and the rotation aperture 42. Additionally, the worm gear 44 may have a length between 2 cm and 3 cm.

The worm gear 44 is selectively engaged by a panel 104 having a grooved surface 106 such that the worm gear 44 and motor 34 move upwardly in the hexagonal worm gear retainer 36 when the motor 34 rotates. The panel 104 may be engaged to the worm gear 44 by use of a slider 108 which selectively holds the panel 104 against the worm gear 44 and releases the panel 104 from the worm gear 44. While the panel 104 engages the worm gear 44, the top end 48 of the worm gear 44 is urged to extend upwardly from the top end 40 of the hexagonal worm gear retainer 36. A tension member 110 may urge the panel 104 out of engagement with the worm gear 44 in a conventional manner such that the worm gear 44 automatically retracts upon manipulation of the slider 108. The worm gear 44 moves downwardly in the hexagonal worm gear retainer 36 when the motor 34 is pulled downwardly by a spring biasing member 101 positioned between the motor 34 and the power supply 97. The spring biasing member 101 is engaged to the motor 34 and fixed to relative to the tubular housing 12 such that the spring biasing member 101 pulls the motor 34 downwardly towards the power supply 97. The worm gear 44 has a fixed length extending from the motor 34 such that the top end 48 of the worm gear 44 recedes downwardly into the hexagonal worm gear retainer 36 when the panel 104 is disengaged from the worm gear 44. The top end 48 of the worm gear 44 may extend beyond the top end 40 of the hexagonal worm gear retainer 36 a distance between 0.5 cm and 1 cm.

An actuator 56 is coupled to a first lateral side 58 of an outer wall 60 of the trapezoidal top portion 22 of the tubular housing 12. The actuator 56 is electrically coupled to the motor 34. Continuing, the actuator 56 selectively actuates the motor 34 in when the actuator 56 is actuated by the user 14. Moreover, the actuator 56 may selectively actuates the motor 34 in a second direction when the actuator 56 is de-actuated by the user 14 to reverse direction of the worm gear 44 while the panel 104 still engages the worm gear 44. The actuator 56 may be a two position switch of any conventional design. A light emitter 62 is coupled to a second lateral side 64 of the outer wall 60 of the trapezoidal top portion 22 of the tubular housing 12. The light emitter 62 is electrically coupled to the actuator 56 so the light emitter 62 selectively emits light when the actuator 56 is actuated by the user 14. The light emitter 62 may be an LED of any conventional design.

A head 66 is removably coupled to the trapezoidal top portion 22 of the tubular housing 12 so a bottom side 68 of the head 66 abuts the top side 20 of the trapezoidal top portion 22 of the tubular housing 12. The bottom side 68 of the head 66 is coextensive with the top side 20 of the trapezoidal top portion 22 of the tubular housing 12 when the head 66 is coupled to the tubular housing 12. Continuing, the head 66 has a rectangular shape that may have a height between 10 cm and 13 cm, a width between 2.5 cm and 5 cm. and a depth between 7 cm and 10 cm. A hexagonal retainer well 70 extends upwardly into the bottom side 68 of the head 66. Moreover, the hexagonal retainer well 70 insertably receives the hexagonal worm gear retainer 36 when the head 66 is removably coupled to the trapezoidal top portion 22 of the tubular housing 12. An outside surface 72 of the hexagonal worm gear retainer 36 abuts an inside surface 74 of the hexagonal retainer well 70 when the head 66 is removably coupled to the tubular housing 12.

A lock opening 76 extends into the head 66 so a lateral portion 78 of the lock opening 76 extends laterally into an outer wall 80 of the head 66. A vertical portion 82 of the lock opening 76 extends downwardly between a rear 84 of the lateral portion 78 of the lock opening 76 and the bottom side 68 of the head 66. The lateral portion 78 of the lock opening 76 has a circular shape. Additionally, the lock opening 76 is one of a pair of lock openings 76 each positioned on an associated one of a first lateral side 86 and a second lateral side 88 of the outer wall 80 of the head 66. Lastly, the vertical portion 82 of each of the pair of lock openings 76 is aligned with an associated one of the pair of tab wells 32 when the head 66 is removably coupled to the trapezoidal top portion 22 of the tubular housing 12.

A lock 90 is movably positioned within the lock opening 76. A button portion 92 of the lock 90 is positioned within the lateral portion 78 of the lock opening 76. Moreover, the button portion 92 of the lock 90 has a circular shape that is coextensive with the lateral portion 78 of the lock opening 76. A spring biasing member 94 extends between an inside wall 96 of the lateral portion 78 of the lock opening 76 and a back side 98 of the button portion 92 of the lock 90. The spring biasing member 94 biases the button portion 92 of the lock 90 outwardly from the lateral portion 78 of the lock opening 76 into an engaging position A tab portion 11 of the lock 90 is coupled to and extends downwardly from a bottom 13 of the button portion 92 of the lock 90. The tab portion 11 of the lock 90 is positioned within the vertical portion 82 of the lock opening 76 such that a bottom end 15 of the tab portion 11 of the lock 90 extends outwardly from a bottom 17 of the vertical portion 82 of the lock opening 76. The bottom end 15 of the tab portion 11 of the lock 90 is arrow shaped. The user 14 actuates the button portion 92 of the lock 90 to urge the lock 90 into a disengaging position.

The lock 90 is one of a pair of the locks 90 each positioned within an associated one of the pair of the lock openings 76. Each of the bottom ends 15 of the tab portions 11 of the lock 90 engages an associated one of the pair of tab wells 32 when the head 66 is removably coupled to the trapezoidal top portion 22 of the tubular housing 12. The pair of tab portions 11 retains the head 66 on the tubular housing 12. The user 14 urges each of the pair of locks 90 into the disengaging to remove the head 66 from the tubular housing 12. Further, each of tab portions 11 of the pair of locks 90 allows the user 14 to quickly release the head 66 from the trapezoidal top portion 22 of the tubular housing 12.

The head 66 is one of a pair of the heads 66. A pinching one of the pair of heads 19 includes a jaw aperture 21 that extends through a top side 23 and a bottom side 25 of the pinching head 19. The jaw aperture 21 is aligned with the hexagonal retainer well 70. Continuing, a pair of jaws 27 is movably coupled to the pinching head 19. The pair of jaws 27 is positioned within the jaw aperture 21 such that a top end 29 of the pair of jaws 27 extends upwardly through the jaw aperture 21. An engaging portion 31 of the pair of jaws 27 extends outwardly from the top end 29 of each of the pair of jaws 27.

A U-shaped jaw actuator 33 is movably coupled to the pinching head 19 so the U-shaped jaw actuator 33 is positioned within the jaw aperture 21. The top end 46 of the worm gear 44 engages a bottom side 35 of the U-shaped jaw actuator 33 when the motor 34 is rotated in the first direction. A top end 37 of the U-shaped jaw actuator 33 engages the pair of jaws 27 so the top end 29 of each of the pair of jaws 27 is urged toward each other. Moreover, the engaging portion 31 of each of the pair of jaws 27 pinches the pipe 16 when the motor 34 is rotated in the first direction. The top end 29 of the pair of jaws 27 moves away from each other when the motor 34 is rotated in the second direction so the pair of jaws 27 release the pipe 16.

A crimping one of the pair of heads 39 has a C-shape so a pipe space 41 is defined between a top portion 43 and a bottom portion 45 of the crimping head 39. The pipe space 41 may have a height between 2.5 cm and 5 cm and a depth between 5 cm and 8 cm. A pair of doors 47 is hingedly coupled to an associated one of a bottom edge 49 of the top portion 43 of the crimping head 39 and a top edge 51 of the bottom portion 45 of the crimping head 39. The pair of doors 47 extends across the pipe space 41 so a free end 53 of each of the pair of doors 47 abuts one another. The pair of doors 47 closes a front side 55 of the pipe space 41.

A clamp groove 57 extends into an inside surface 59 of the pipe space 41 in the crimping head 39. The clamp groove 57 extends along the top portion 43, a lateral portion 61 and the bottom portion 45 of the crimping head 39. A clamp 63 is movably coupled to the crimping head 39 so the clamp 63 is positioned within the clamp groove 57. Moreover, a bottom surface 65 of the clamp 63 is curvilinear with respect to a top surface 67 of the clamp 63 so the clamp 63 has a semi-circular shape.

The clamp 63 is one of a pair of clamps 63 each movably coupled to an associated one of the top 43 and bottom 45 portions of the crimping head 39. Additionally, each of the pair of clamps 63 is positioned within the clamp groove 57. Each of a top one 65 and a bottom one 67 of the pair of clamps 63 is urged toward each other when the motor 34 is rotated in a first direction so the crimping head 39 may crimp a fitting 69 onto the pipe 16. The fitting 69 may be a PEX fitting of any conventional design.

Each of the top 65 and bottom 67 clamps is one of a plurality of sets of clamps 71. The plurality of sets of clamps 71 comprises a plurality of concentric rings. An outermost one of the plurality of sets of clamps 73 may have a diameter between 22 mm and 28 mm. A middle one of the plurality of sets of clamps 75 may have a diameter between 17 mm and 20 mm. Finally, an innermost one of the plurality of sets of clamps 77 may have a diameter between 10 mm and 15 mm.

A selector 79 extends through a selector groove 81 on a first lateral side 83 of the crimping head 69. The selector 79 is one of a pair of selectors 79 extending through an associated one of a pair of selector grooves 81. Each of the pair of selectors 79 and the associated one of the pair of selector grooves 81 is positioned on an associated one of the top 43 and bottom 45 portions of the crimping head 69. An engaging end 85 of each of the pair of selectors 79 engages a selected one of an adjustment aperture 87 extending laterally through each of the plurality of sets of clamps 71. The user 14 selects the selected one of the plurality of sets of clamps 71 that corresponds to the size of fitting 69 to be crimped on the pipe 16.

The crimping head 69 is one of a pair of crimping heads 69. A cutting one of the pair of crimping heads 89 includes a cutting wheel 91 movably coupled to the bottom portion 43 of the cutting head 89. The worm gear 44 engages a bottom 93 of the cutting wheel 91 when the motor 34 is rotated in the first direction. A top edge 95 of the cutting wheel 91 engages the pipe 16 so the cutting wheel 91 may cut the pipe 16. Additionally, a pair of spring biasing members 100 is positioned between the cutting wheel and the bottom wall 68 of the cutting one of the crimping heads 89. The pair of spring biasing member 100 biases the cutting wheel towards from the bottom wall 68 of the cutting one of the crimping heads 89.

A power supply 97 is coupled to the tubular housing 12. The power supply 97 is positioned within an interior of the bottom portion 30 of the tubular housing 12. Continuing, the power supply 97 is electrically coupled to the actuator 56. The power supply 97 comprising at least one battery 99. Continuing, the power supply 97 may have an operational voltage between 9 VDC and 12 VDC. The spring biasing member 101 is positioned between the motor 34 and the power supply 97. The spring biasing member 101 biases the motor 34 downwardly in the tubular housing 12 to retract the worm gear 44 when the panel 102 is disengaged from the worm gear 44 by sliding of the gear release switch 104.

In use, the user 14 selectively removably couples the pinching head 19 to the tubular housing 12 to pinch the pipe 16. The user 14 positions the pinching head 19 below the pipe 16 so the pair of jaws 27 engages the pipe 16 when the actuator 56 is actuated. Continuing, the user 14 selectively removably couples the crimping head 39 to the tubular housing 12 to crimp the fitting 69 onto the pipe 16. The user 14 positions the crimping head 39 so the pipe 16 extends laterally through the pipe space 41. Continuing, the user 14 selects the appropriate size of plurality of sets of clamps 75 with the pair of selectors 79. The user 14 actuates the actuator 56 so the selected set of clamps 75 is urged toward each other to compress the fitting 69 between the selected set of clamps 75. Additionally, the user 14 selectively removably couples the cutting head 89 to the tubular housing 12. The user 14 positions the cutting head 89 so the pipe 16 extends laterally through the pipe space 41. Lastly, the user 14 actuates the actuator 56 so the cutting wheel 91 engages the pipe 16 to cut the pipe 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. A multiple purpose tool assembly for performing various manipulations of a pipe, said assembly comprising:
   a tubular housing configured to be gripped by a user wherein said tubular housing is selectively positionable proximate the pipe;
   a motor operationally coupled to said tubular housing;
   a worm gear operationally coupled to said motor wherein said motor selectively rotates said worm gear;
   an actuator operationally coupled to said tubular housing, said actuator being operationally coupled to said motor wherein said actuator selectively actuates said motor; and
   a head removably coupled to said tubular housing wherein said head is operationally coupled to said worm gear wherein said head is selectively actuated, said head selectively engaging the pipe wherein said head is configured to selectively manipulate the pipe;
   a hexagonal worm gear well extending downwardly into a top side of a trapezoidal top portion of said tubular housing;
   a worm gear aperture extending through a bottom side of said trapezoidal top portion of said tubular housing and a bottom wall of said hexagonal worm gear well wherein said hexagonal worm gear well is in fluid communication with an interior of a bottom portion of said tubular housing; and
   a pair of tab wells extending downwardly into said top side of said trapezoidal top portion of said tubular housing wherein each of said pair of tab wells is positioned on opposite sides of said hexagonal worm gear well.

2. The assembly according to claim 1, further comprising said motor being positioned within an interior of a bottom portion of said tubular housing proximate a worm gear aperture.

3. The assembly according to claim 1, further comprising:
   a hexagonal worm gear retainer positioned within a hexagonal worm gear well wherein a bottom end of said hexagonal worm gear retainer abuts a bottom wall of said hexagonal worm gear well wherein a top end of said hexagonal worm gear retainer extends upwardly from a top side of a trapezoidal top portion of said tubular housing; and a rotation aperture extending through said bottom end and said top end of said hexagonal worm gear retainer wherein said rotation aperture is aligned with a worm gear aperture.

4. The assembly according to claim 3, further comprising:
said worm gear being elongated along a longitudinal axis extending through a bottom end and a top end of said worm gear; and
said bottom end of said worm gear being rotationally coupled to a top end of said motor wherein said worm gear extends upwardly through a worm gear aperture and a rotation aperture.

5. The assembly according to claim 4, further comprising:
an outer surface of said worm gear threadably engaging a grooved surface of a selectively movable panel coupled to a worm gear retainer wherein said worm gear selectively climbs upwardly in said hexagonal worm gear retainer when said motor rotates said worm gear in a first direction wherein said top end of said worm gear extends upwardly from a top end of said hexagonal worm gear retainer; and
said worm gear selectively moving downwardly in said hexagonal worm gear retainer when said motor rotates in a second direction wherein said top end of said worm gear recedes downwardly into said hexagonal worm gear retainer.

6. The assembly according to claim 1, further comprising:
said actuator being coupled to a first lateral side of an outer wall of a trapezoidal top portion of said tubular housing;
said actuator being electrically coupled to said motor wherein said actuator selectively actuates said motor in a first direction when said actuator is actuated by a user; and
said actuator selectively actuating said motor in a second direction when said actuator is de-actuated by the user.

7. The assembly according to claim 1, further comprising:
said head being removably coupled to a trapezoidal top portion of said tubular housing wherein a bottom side of said head abuts a top side of said trapezoidal top portion of said tubular housing; and
a hexagonal retainer well extending upwardly into a bottom side of said head wherein said hexagonal retainer well insertably receives a hexagonal worm gear retainer when said head is removably coupled to said trapezoidal top portion of said tubular housing.

8. The assembly according to claim 1, further comprising:
a lock opening in said head wherein a lateral portion of said lock opening extends laterally into an outer wall of said head; and
a vertical portion of said lock opening extending downwardly between a rear of said lateral portion of said lock opening and a bottom side of said head.

9. A multiple purpose tool assembly for performing various manipulations of a pipe, said assembly comprising:
a tubular housing configured to be gripped by a user wherein said tubular housing is selectively positionable proximate the pipe;
a motor operationally coupled to said tubular housing;
a worm gear operationally coupled to said motor wherein said motor selectively rotates said worm gear;
an actuator operationally coupled to said tubular housing, said actuator being operationally coupled to said motor wherein said actuator selectively actuates said motor;
a head removably coupled to said tubular housing wherein said head is operationally coupled to said worm gear wherein said head is selectively actuated, said head selectively engaging the pipe wherein said head is configured to selectively manipulate the pipe;
said lock opening being one of a pair of said lock openings each positioned on an associated one of a first lateral side and a second lateral side of said outer wall of said head; and
said vertical portion of each of said pair of lock openings being aligned with an associated one of a pair of tab wells when said head is removably coupled to said trapezoidal top portion of said tubular housing.

10. The assembly according to claim 1, further comprising:
a lock movably positioned within a lock opening wherein a button portion of said lock is positioned within a lateral portion of said lock opening;
a tab portion of said lock coupled to and extending downwardly from a bottom of said button portion of said lock wherein said tab portion of said lock is positioned within a vertical portion of said lock opening such that a bottom end of said tab portion of said lock extends outwardly from a bottom of said vertical portion of said lock opening;
said lock being one of a pair of said locks each being positioned within an associated one of a pair of said lock openings; and
each of said bottom ends of tab portions of said lock engaging an associated one of a pair of tab wells when said head is removably coupled to said trapezoidal top portion of said tubular housing wherein said head is retained on said tubular housing.

11. The assembly according to claim 1, further comprising said head being one of a pair of said heads.

12. The assembly according to claim 9, further comprising:
a pinching one of said pair of heads comprising;
a jaw aperture extending through a top side and a bottom side of said pinching head wherein said jaw aperture is aligned with a hexagonal retainer well;
a pair of jaws movably coupled to said pinching head wherein said pair of jaws is positioned within said jaw aperture such that a top end of said pair of jaws extends upwardly through said jaw aperture; and
a U-shaped jaw actuator movably coupled to said pinching head wherein said U-shaped jaw actuator is positioned within said jaw aperture.

13. The assembly according to claim 9, further comprising:
a top end of a worm gear engaging a bottom side of said U-shaped jaw actuator when said motor is rotated in a first direction wherein a top end of said U-shaped jaw actuator engages said pair of jaws wherein said top end of each of said pair of jaws is urged toward each other wherein said pair of jaws is configured to pinch the pipe; and
said top end of said pair of jaws moving away from each other when said motor is rotated in a second direction wherein said pair of jaws is configured to release the pipe.

14. The assembly according to claim 9, further comprising:
- a crimping one of said pair of heads having a C-shape wherein a pipe space is defined between a top portion and a bottom portion of said crimping head; and
- a clamp groove extending into an inside surface of said pipe space wherein said clamp groove extends along said top portion, a lateral portion and said bottom portion of said crimping head.

15. The assembly according to claim 14, further comprising:
- a clamp movably coupled to said crimping head wherein said clamp is positioned within said clamp groove;
- said clamp being one of a pair of said clamps each being movably coupled to an associated one of said top and bottom portions of said crimping head; and
- each of a top one and a bottom one of said pair of clamps being urged toward each other when said motor is rotated in a first direction wherein said crimping head is configured to crimp a fitting onto the pipe.

16. The assembly according to claim 1, further comprising:
- a power supply coupled to said tubular housing wherein said power supply is positioned within an interior of a bottom portion of said tubular housing;
- said power supply being electrically coupled to said actuator; and
- said power supply comprising at least one battery.

17. A multiple purpose tool assembly for performing various manipulations of a pipe, said assembly comprising:
- a tubular housing configured to be gripped by a user wherein said tubular housing is selectively positionable proximate the pipe;
- a hexagonal worm gear well extending downwardly into a top side of a trapezoidal top portion of said tubular housing;
- a worm gear aperture extending through a bottom side of said trapezoidal top portion of said tubular housing and a bottom wall of said hexagonal worm gear well wherein said hexagonal worm gear well is in fluid communication with an interior of a bottom portion of said tubular housing;
- a pair of tab wells extending downwardly into said top side of said trapezoidal top portion of said tubular housing wherein each of said pair of tab wells is positioned on opposite sides of said hexagonal worm gear well;
- a motor positioned within said interior of said bottom portion of said tubular housing proximate said worm gear aperture;
- a hexagonal worm gear retainer positioned within said hexagonal worm gear well wherein a bottom end of said hexagonal worm gear retainer abuts said bottom wall of said hexagonal worm gear well wherein a top end of said hexagonal worm gear retainer extends upwardly from said top side of said trapezoidal top portion of said tubular housing;
- a rotation aperture extending through said bottom end and said top end of said hexagonal worm gear retainer wherein said rotation aperture is aligned with said worm gear aperture;
- a worm gear elongated along a longitudinal axis extending through a bottom end and a top end of said worm gear, said bottom end of said worm gear being rotationally coupled to a top end of said motor wherein said worm gear extends upwardly through said worm gear aperture and said rotation aperture, an outer surface of said worm gear threadably engaging a grooved surface of a movable panel coupled to said worm gear retainer wherein said worm gear climbs upwardly in said hexagonal worm gear retainer when said motor rotates in a first direction such that said top end of said worm gear extends upwardly from said top end of said hexagonal worm gear retainer, said worm gear moving downwardly in said hexagonal worm gear retainer when said motor rotates in a second direction wherein said top end of said worm gear recedes downwardly into said hexagonal worm gear retainer;
- a slider coupled to said tubular housing, said slider being coupled to said panel wherein manipulation of said slider selectively engages said grooved surface to said worm gear;
- an actuator coupled to a first lateral side of an outer wall of said trapezoidal top portion of said tubular housing, said actuator being electrically coupled to said motor wherein said actuator selectively actuates said motor in a first direction when said actuator is actuated by a user, said actuator selectively actuating said motor in a second direction when said actuator is de-actuated by the user;
- a head removably coupled to said trapezoidal top portion of said tubular housing wherein a bottom side of said head abuts said top side of said trapezoidal top portion of said tubular housing;
- a hexagonal retainer well extending upwardly into said bottom side of said head wherein said hexagonal retainer well insertably receives said hexagonal worm gear retainer when said head is removably coupled to said trapezoidal top portion of said tubular housing;
- a lock opening in said head wherein a lateral portion of said lock opening extends laterally into an outer wall of said head, a vertical portion of said lock opening extending downwardly between a rear of said lateral portion of said lock opening and said bottom side of said head;
- said lock opening being one of a pair of said lock openings each positioned on an associated one of a first lateral side and a second lateral side of said outer wall of said head, said vertical portion of each of said pair of lock openings being aligned with an associated one of said pair of tab wells when said head is removably coupled to said trapezoidal top portion of said tubular housing;
- a lock movably positioned within said lock opening wherein a button portion of said lock is positioned within said lateral portion of said lock opening, a tab portion of said lock coupled to and extending downwardly from a bottom of said button portion of said lock wherein said tab portion of said lock is positioned within said vertical portion of said lock opening such that a bottom end of said tab portion of said lock extends outwardly from a bottom of said vertical portion of said lock opening;
- said lock being one of a pair of said locks each being positioned within an associated one of said pair of said lock openings, each of said bottom ends of tab portions of said lock engaging an associated one of said pair of tab wells when said head is removably coupled to said trapezoidal top portion of said tubular housing wherein said head is retained on said tubular housing;
- said head being one of a pair of said heads;

a pinching one of said pair of heads comprising;
a jaw aperture extending through a top side and a bottom side of said pinching head wherein said jaw aperture is aligned with said hexagonal retainer well;
a pair of jaws movably coupled to said pinching head wherein said pair of jaws is positioned within said jaw aperture such that a top end of said pair of jaws extends upwardly through said jaw aperture;
a U-shaped jaw actuator movably coupled to said pinching head wherein said U-shaped jaw actuator is positioned within said jaw aperture, said top end of said worm gear engaging a bottom side of said U-shaped jaw actuator when said motor is rotated in a first direction wherein a top end of said U-shaped jaw actuator engages said pair of jaws wherein said top end of each of said pair of jaws is urged toward each other wherein said pair of jaws is configured to pinch the pipe, said top end of said pair of jaws moving away from each other when said motor is rotated in a second direction wherein said pair of jaws is configured to release the pipe;
a crimping one of said pair of heads having a C-shape wherein a pipe space is defined between a top portion and a bottom portion of said crimping head;
a clamp groove extending into an inside surface of said pipe space in said crimping head wherein said clamp groove extends along said top portion, a lateral portion and said bottom portion of said crimping head;
a clamp movably coupled to said crimping head wherein said clamp is positioned within said clamp groove, said clamp being one of a pair of said clamps each being movably coupled to an associated one of said top and bottom portions of said crimping head, each of a top one and a bottom one of said pair of clamps being urged toward each other when said motor is rotated in a first direction wherein said crimping head is configured to crimp a fitting onto the pipe; and
a power supply coupled to said tubular housing wherein said power supply is positioned within an interior of said bottom portion of said tubular housing, said power supply being electrically coupled to said actuator, said power supply comprising at least one battery.

\* \* \* \* \*